United States Patent
Lv et al.

(10) Patent No.: US 12,001,569 B2
(45) Date of Patent: Jun. 4, 2024

(54) MODEL TRAINING METHOD, MODEL USING METHOD, SYSTEM, TRUSTED NODE AND DEVICE

(71) Applicant: Jiangsu Superfluidity Information Technology Co., Ltd, Kunshan (CN)

(72) Inventors: Chuan Lv, Kunshan (CN); Xiaoxing Zhang, Kunshan (CN)

(73) Assignee: JIANGSU SUPERFLUIDITY INFORMATION TECHNOLOGY CO., LTD, Kunshan (CN)

( * ) Notice: Subject to any disclaimer, the term of this patent is extended or adjusted under 35 U.S.C. 154(b) by 295 days.

(21) Appl. No.: 17/669,922

(22) Filed: Feb. 11, 2022

(65) Prior Publication Data

US 2022/0350898 A1 Nov. 3, 2022

(30) Foreign Application Priority Data

Apr. 29, 2021 (CN) .......................... 202110476948.4

(51) Int. Cl.
*H04L 9/08* (2006.01)
*G06F 21/60* (2013.01)
*G06N 10/60* (2022.01)
*G06N 20/00* (2019.01)

(52) U.S. Cl.
CPC .......... *G06F 21/602* (2013.01); *G06N 10/60* (2022.01); *G06N 20/00* (2019.01); *H04L 9/0852* (2013.01)

(58) Field of Classification Search
CPC ... H04L 9/0852; H04L 9/0894; H04L 9/0866; H04L 9/16; H04L 63/0428; G06N 20/00; G06N 10/60; G06F 21/602
See application file for complete search history.

(56) References Cited

U.S. PATENT DOCUMENTS

| 11,615,213 | B2 * | 3/2023 | Han | G06F 21/78 |
| | | | | 713/193 |
| 2009/0262942 | A1 * | 10/2009 | Maeda | H04L 9/083 |
| | | | | 380/278 |
| 2016/0359626 | A1 * | 12/2016 | Fu | H04L 9/0858 |
| 2017/0237558 | A1 * | 8/2017 | Yuan | H04L 9/12 |
| | | | | 380/279 |
| 2019/0260581 | A1 * | 8/2019 | Su | H04L 9/0838 |
| 2019/0370603 | A1 * | 12/2019 | Chen | H04L 67/04 |
| 2020/0334571 | A1 * | 10/2020 | Bai | G06T 7/20 |

(Continued)

*Primary Examiner* — Mohammad A Siddiqi
(74) *Attorney, Agent, or Firm* — Getech Law LLC; Jun Ye

(57) ABSTRACT

Aspects relating to machine learning includes receiving, by a first trusted node, a first target data set sent by a first participant, wherein the first target data set is obtained via encrypting, by the first participant, a data set provided by the first participant based on a first preset encryption mode; decrypting the first target data set, determining first training data, and performing model training for a preset machine learning model based on the first training data to obtain a first intermediate training result; acquiring an encrypted second intermediate training result sent by at least one second trusted node; and performing federated learning for the preset machine learning model based on at least the first intermediate training result and the decrypted second intermediate training result, to update model parameters of the preset machine learning model and obtain a learning completed target model.

18 Claims, 4 Drawing Sheets

(56) References Cited

U.S. PATENT DOCUMENTS

| | | | |
|---|---|---|---|
| 2021/0004696 A1* | 1/2021 | Lin | G06F 21/602 |
| 2021/0044432 A1* | 2/2021 | Li | H04L 9/12 |
| 2021/0105270 A1* | 4/2021 | Zhao | H04L 63/0853 |
| 2021/0117395 A1* | 4/2021 | Wang | G06F 21/53 |
| 2022/0294616 A1* | 9/2022 | Parry | H04L 9/0855 |
| 2023/0342669 A1* | 10/2023 | Shao | G06N 20/00 |

* cited by examiner

MODEL TRAINING METHOD, MODEL USING METHOD, SYSTEM, TRUSTED NODE AND DEVICE

TECHNICAL FIELD

Embodiments of the present disclosure relates to a field of big data processing, and in particular, to a model training method, a model using method and a system based on federated learning, a trusted node, and a device.

BACKGROUND

Federated machine learning is also known as federated learning, joint learning, and alliance learning. Federated machine learning refers to a machine learning framework that effectively assists multiple institutions (i.e. multiple users) in data usage and machine learning modeling while meeting the requirements of user privacy protection, data security and government regulations.

Federated learning, since proposed in 2016, has gained wide attention from academia and industry. However, as federated machine learning technology is inseparable from data encryption technology, the data features and labels of horizontal federated learning, and the intermediate variables and gradient information of vertical federated learning must be transmitted after encryption and calculated in encrypted state. In the process of machine learning, computing in encrypted state will inevitably lead to a sharp increase in data volume in order of magnitude. For example, homomorphic encryption algorithm used in the existing model training will lead to an increase in data volume by more than 30 times, which will inevitably lead to consumption of extra storage, computing and network resources.

SUMMARY

The embodiments of the present disclosure provide a model training method, a model using method and a system based on federated learning, a trusted node, a device, and a storage medium are provided.

According to an aspect of the present disclosure, a model training method based on federated learning is provided. The model training method includes receiving, by a first trusted node, a first target data set sent by a first participant. The first target data set is obtained via encrypting, by the first participant, a data set provided by the first participant based on a first preset encryption mode.

The model training method further includes decrypting the first target data set, determining first training data, and performing model training for a preset machine learning model based on the first training data to obtain a first intermediate training result.

The model training method further includes acquiring an encrypted second intermediate training result sent by at least one second trusted node. The second intermediate training result is obtained via performing, by the second trusted node, model training for the preset machine learning model based on at least second training data. The second training data is determined after decrypting, by the second trusted node, an encrypted second target data set, and the second target data set is provided by a second participant for federated learning with the first target data set.

The model training method further includes performing federated learning for the preset machine learning model based on at least the first intermediate training result and the decrypted second intermediate training result, to update model parameters of the preset machine learning model and obtain a learning completed target model.

According to another aspect of the present disclosure, a model using method based on federated learning is provided. The model using method includes acquiring, by a first trusted node, data to be predicted.

The model using method further includes inputting the data to be predicted into a target model stored by the first trusted node to obtain a first output result. The target model is a model obtained by the training method described above.

According to another aspect of the present disclosure, a first trusted node is provided. The first trusted node includes a first receiving unit configured to receive a first target data set sent by a first participant. The first target data set is obtained via encrypting, by the first participant, a data set provided by the first participant based on a first preset encryption mode.

The first trusted node further includes an intermediate training result determination unit configured to decrypt the first target data set, determine first training data, and perform model training for a preset machine learning model based on the first training data to obtain a first intermediate training result.

The first trusted node further includes an intermediate training result acquisition unit configured to acquire an encrypted second intermediate training result sent by at least one second trusted node. The second intermediate training result is obtained via performing, by the second trusted node, model training for the preset machine learning model based on at least second training data. The second training data is determined after decrypting, by the second trusted node, an encrypted second target data set, and the second target data set is provided by a second participant for federated learning with the first target data set.

The first trusted node further includes a federated learning unit configured to perform federated learning for the preset machine learning model based on at least the first intermediate training result and the decrypted second intermediate training result, to update model parameters of the preset machine learning model and obtain a learning completed target model.

According to another aspect of the present disclosure, a first trusted node is provided. The first trusted node includes an acquisition unit configured to acquire data to be predicted.

The first trusted node further includes a model prediction unit configured to input the data to be predicted into a target model stored by the first trusted node to obtain a first output result. The target model is a model obtained by the model training method described above.

According to another aspect of the present disclosure, an electronic device is provided. The electronic device includes at least one processor and a memory communicatively connected to the at least one processor. The memory stores instructions executable by the at least one processor, and the instructions are executed by the at least one processor to enable the at least one processor to execute the model training method described above, or execute the model using method described above.

According to another aspect of the present disclosure, a non-transitory computer readable storage medium is provided. The computer instructions are used to make a computer execute the model training method described above, or execute the model using method described above.

According to another aspect of the present disclosure, a model training system based on federated learning is provided. The model training system includes a first trusted node and at least one second trusted node. The above first trusted node is configured to receive a first target data set sent by a first participant. The first target data set is obtained via encrypting, by the first participant, a data set provided by the first participant based on a first preset encryption mode. The first trusted node is further configured to decrypt the first target data set, determine first training data, and perform model training for a preset machine learning model based on the first training data to obtain a first intermediate training result.

The above second trusted node is configured to send an encrypted second intermediate training result. The second intermediate training result is obtained via performing, by the second trusted node, model training for the preset machine learning model based on at least second training data. The second training data is determined after decrypting, by the second trusted node, an encrypted second target data set. The second target data set is provided by a second participant for federated learning with the first target data set.

The above first trusted node is further configured to acquire the encrypted second intermediate training result sent by the at least one second trusted node, and perform federated learning for the preset machine learning model based on at least the first intermediate training result and the decrypted second intermediate training result, to update model parameters of the preset machine learning model and obtain a learning completed target model.

According to another aspect of the present disclosure, a model using system based on federated learning is provided. The model using system includes a first trusted node and at least one second trusted node.

The above first trusted node is configured to acquire data to be predicted and input the data to be predicted into a target model stored by the first trusted node to obtain a first output result. The target model is a model obtained by the training method described above.

The second trusted node is configured to receive the data to be predicted sent by the first trusted node, input the data to be predicted into a target model stored by the second trusted node to obtain a second output result, and send the second output result.

The first trusted node is further configured to obtain a prediction result for the data to be predicted based on at least the first output result and the second output result.

According to the technology of the present disclosure, federated learning can be realized, and meanwhile, the existing problem of consumption of extra storage, computing and network resources can be solved.

It should be understood that, the above summary is not intended to identify key or important features of the embodiments of the present disclosure, and is not intended to limit the scope of the present disclosure. Additional features of the present disclosure may be readily understood from the following detailed description.

BRIEF DESCRIPTION OF THE DRAWINGS

One or more embodiments are exemplarily described by using figures that are corresponding thereto in the accompanying drawings; the exemplary descriptions do not constitute limitations on the embodiments. Elements with same reference numerals in the accompanying drawings are similar elements. Unless otherwise particularly stated, the figures in the accompanying drawings do not constitute a scale limitation.

DETAILED DESCRIPTION

The exemplary embodiments of the present disclosure will be described below in combination with drawings, including various details of the embodiments of the present disclosure to facilitate understanding, which should be considered as exemplary only. Therefore, those of ordinary skill in the art should realize that various changes and modifications can be made to the embodiments described herein without departing from the scope and spirit of the present disclosure. Likewise, descriptions of well-known functions and structures are omitted in the following description for clarity and conciseness.

As is well known, algorithm, computing power and data are the three pillars of artificial intelligence, which support each other and are indispensable from each other. Machine learning, as the algorithm core of artificial intelligence, requires a large amount data to train high-performance and high-precision models to solve problems such as unmanned driving, face recognition and so on. However, the reality is that most enterprises and institutions have problems such as small amount of data and poor data quality, which are not enough to support the training requirements of machine learning models. In this context, federated learning came into being. Federated learning is essentially a distributed machine learning technology, aiming to realize the joint modeling of different data owners on the basis of ensuring data privacy and security and legal compliance, and improve the effect of machine learning models, such as AI model.

In view of this, according to the scheme of the present disclosure, a federated machine learning scheme combined with quantum encryption is provided, aiming to combine quantum encryption technology with machine learning technology to improve the federated learning technology in the existing machine learning field.

Figure 1:
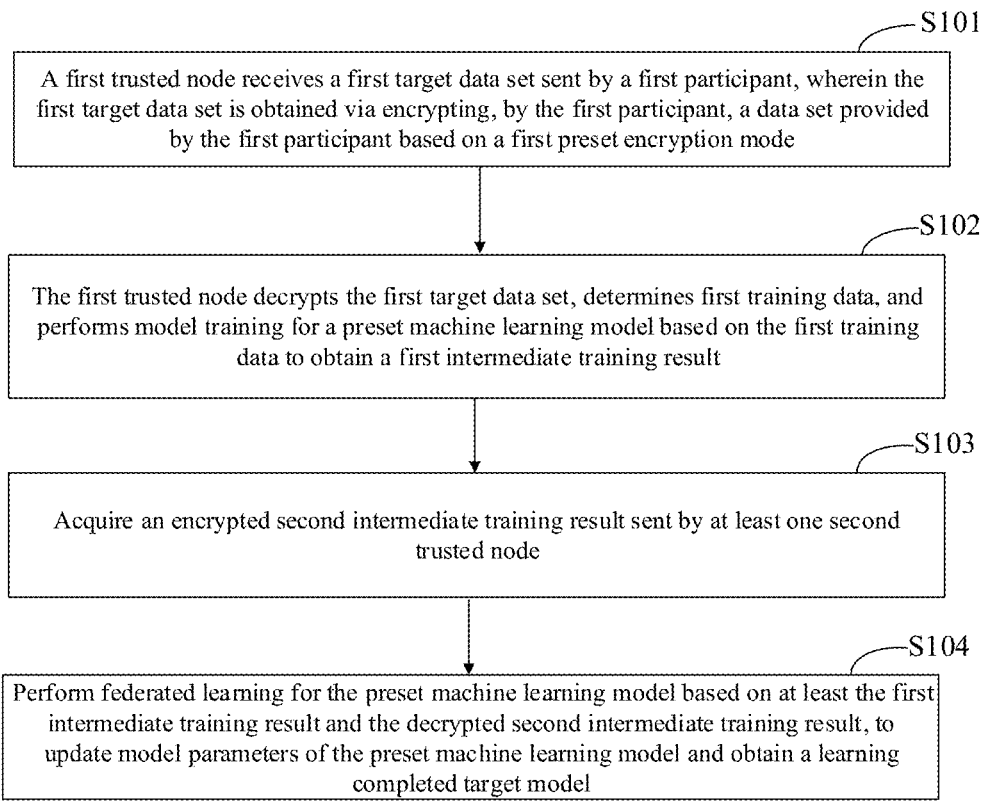
FIG. 1 shows an implementation flow diagram of a model training method based on federated learning according to an embodiment of the present disclosure.

FIG. 1 shows an implementation flow diagram of a model training method based on federated learning according to an embodiment of the present disclosure, which is applied to a first trusted node. As shown in FIG. 1, the method includes step S101, S102, S103 and S104.

In step S101, a first trusted node receives a first target data set sent by a first participant. The first target data set is obtained via encrypting, by the first participant, a data set provided by the first participant based on a first preset encryption mode.

In the scheme of the present disclosure, the first participant may represent a device used by a first participating user, such as desktop computer, server and other electronic devices. The data set provided by the first participant is a data set for federated learning, such as user browsing data, etc., but is not limited thereto.

In the scheme of the present disclosure, the first target data set received by the first trusted node is encrypted data, which improves the security of data during transmission. In practical applications, the first preset encryption mode is an encryption mode agreed by the first trusted node and a first parameter, such as a quantum encryption mode using quantum key for encryption, or a classical encryption mode, such as RSA encryption algorithm, message-digest algorithm 5 (MD5), data encryption standard (DES) algorithm, etc.

In step S102, the first trusted node decrypts the first target data set, determines first training data, and performs model training for a preset machine learning model based on the first training data to obtain a first intermediate training result.

In the scheme of the present disclosure, the first preset encryption mode is an encryption mode agreed by the first trusted node and the first parameter, and accordingly the first trusted node decrypts the first target data set based on an agreed decryption mode to obtain the first training data. In other words, the first training data is obtained via decryption and is unencrypted data, so that the first trusted node is capable of performing model training for the preset machine learning model based on the unencrypted data, which improves the efficiency of model training, and lays a foundation for reducing the usage of the computing resources and storage resources in the process of federated learning.

It should be noted here that the first intermediate training result is any result produced in the model training process. In practical applications, the intermediate training result may be different for different preset machine learning models, which is not limited herein.

In step S103, an encrypted second intermediate training result sent by at least one second trusted node is acquired. The second intermediate training result is obtained via performing, by the second trusted node, model training for the preset machine learning model based on at least second training data. The second training data is determined after decrypting, by the second trusted node, an encrypted second target data set, and the second target data set is provided by a second participant for federated learning with the first target data set.

That is to say, the second participant encrypts the second target data set for federated learning with the first target data set and sends the encrypted second target data set to the second trusted node. The second trusted node decrypts the encrypted second target data set to obtain the second training data, and performs model training for the preset machine learning model based on at least the second training data to obtain a second intermediate training result, then encrypts the second intermediate training result and send the second intermediate training result to the first trusted node.

It should be noted that, similar to the first participant, the second participant may represent a device used by a second participating user, such as desktop computer, server and other electronic devices. The data set provided by the second participant is a data set for federated learning, such as user browsing data, etc., but is not limited thereto. The second intermediate training result is any result produced in the model training process. In practical applications, the intermediate training result may be different for different preset machine learning models, which is not limited herein.

In addition, it should be noted that in practical applications, data transmitted between participants and trusted nodes, such as between the first participant and the first trusted node, between the second participant and the second trusted node, and between trusted nodes, such as between the first trusted node and the second trusted node, are all encrypted data, which improves the security of data during transmission. For example, the data transmitted between participants and trusted nodes may be encrypted by the quantum encryption mode or the classical encryption mode; while the data transmitted between trusted nodes may be encrypted by the quantum encryption mode, which improves the security of data transmission in the process of federated learning and provides a guarantee for the data privacy and security of participating users.

In step S104, federated learning is performed for the preset machine learning model based on at least the first intermediate training result and the decrypted second intermediate training result, to update model parameters of the preset machine learning model and obtain a learning completed target model.

For example, suppose that company A (i.e., the first participating user) and company B (i.e., the second participating user) want to jointly train a machine learning model, and each has its own data set in its electronic device. In addition, company B also has label data required for model training, that is, the label data for the data set of company B. Due to data privacy and security, company A and company B cannot exchange data directly. Therefore, in order to ensure the confidentiality of data in the training process, a third party, i.e. a trusted node, is introduced. Here, the data transmission between trusted nodes in a preset communication network is performed after encryption with quantum key. Moreover, the third party is trusted, which will not leak the data set sent by company A or company B to other devices outside the preset communication network, thus laying a foundation for solving the problems of data privacy and potential safety hazards.

Furthermore, due to the above characteristics of the trusted node, the data used for model training in the trusted node is unencrypted data, which lays a foundation for solving the existing problems of large consumption of extra storage, computing and network resources caused by model training in encrypted state.

In this way, since the third party used for federated learning in the scheme of the present disclosure is a trusted node, there is no need to perform model training in encrypted state, which solves the existing problems of large consumption of extra storage, computing and network resources caused by model training in encrypted state, and reduces the cost of machine learning on the basis of realizing federated learning, such as reducing the costs of network bandwidth, computing resources and manpower maintenance. Furthermore, since the model training method according to the scheme of the present disclosure may be performed in decrypted state, there are more types of machine learning models that can be used. In other words, the types of machine learning models to be trained are not limited herein, so the application scope and adaptability of the present disclosure are wider, and the cost thereof is lower.

In a specific example of the scheme of the present disclosure, in order to realize federated learning, the first intermediate training result obtained by the training of the first trusted node may also be encrypted in a following manner, and sent to other nodes participating in federated learning. Specifically, the first trusted node encrypts the first intermediate training result based on a second preset encryption mode and sends the encrypted first intermediate training result to the second trusted node; the second trusted node is capable of decrypting the encrypted first intermediate training result to perform model training for the preset machine learning model and thereby update the model parameters of the preset machine learning model.

In a specific example, the second trusted node may obtain an intermediate training result again after updating the model parameters, and sends the obtained intermediate training result to the first trusted node again. This cycle is continued until a learning completed target model is obtained. For example, this cycle is continued until the target loss function used in the model training process converges and a learning completed target model is obtained.

It should be noted here that the second preset encryption mode represents an encryption mode between trusted nodes, that is, the data transmission between the first trusted node and the second trusted node can be realized by the second preset encryption mode. In this way, the security of data transmission is improved, which lays a foundation for solving problems such as data privacy and potential safety hazards.

In a specific example of the scheme of the present disclosure, the data transmission between the first trusted node and the second trusted node is encrypted by quantum encryption mode, which improves the security of data transmission in the process of federated learning and provides a guarantee for the data privacy and security of participating users. Specifically, encrypting the first intermediate training result based on the second preset encryption mode includes encrypting the first intermediate training result based on a first quantum key generated by a first quantum key generation device contained in the first trusted node. That is to say, in this example, the first trusted node contains a quantum key generation device, that is, the first quantum key generation device may generate a quantum key, that is, the first quantum key. In this way, the first intermediate training result is encrypted based on the first quantum key, and then the encrypted first intermediate training result is to be transmitted to other trusted nodes participating in federated learning, such as the second trusted node, to improve the security of data transmission. Here, due to the use of quantum encryption technology, compared with other encryption modes, the security is higher, which further improves the security of data transmission.

In a specific example, the first quantum key generated by the first trusted node is one of a quantum key pair, and the other quantum key of the quantum key pair is generated by a second quantum key generation device contained in the second trusted node which is a receiving end of the first intermediate training result. The quantum key pair includes symmetric keys, which is convenient for the receiving end, that is, the second trusted node, to decrypt the received first intermediate training result encrypted based on the first quantum key.

In a specific example of the scheme of the present disclosure, the first quantum key generation device stores a key pool, and the key pool contains at least one quantum key. That is, the first quantum key generation device stores the generated quantum key in the key pool. Further, encrypting the first intermediate training result based on the first quantum key generated by the first quantum key generation device contained in the first trusted node specifically includes acquiring the first quantum key from the key pool based on a first router contained in the first trusted node, and encrypting the first intermediate training result based on the first quantum key. Here, in this example, the first trusted node contains a quantum key generation device, that is, the first quantum key generation device, which may generate a quantum key, that is, the first quantum key. At the same time, the first trusted node also contains a first router, which is used to acquire the first quantum key from the key pool, and encrypt the first intermediate training result to be transmitted based on the first quantum key and then transmit. That is, the first router has the authority of managing incoming and outgoing data, so as to improve the security of data transmission. Here, due to the use of quantum encryption technology, compared with other encryption modes, the security is higher, which further improves the security of data transmission. Moreover, the quantum encryption technology is simple, feasible and low in cost, which lays a foundation for the wide application of federated learning.

It should be noted that, in an example, the first router contained in the first trusted node performs quantum cryptography on the data to be transmitted and then transmits it, which is equivalent to using the first router to realize the security lock function, so that the first trusted node can be used as a physical security device Thus, on the one hand, the overall security of the first trusted node is improved, and on the other hand, it is laid a foundation for completing the federated learning in decrypted state. In other examples, the first router further receives and manages (for example, decrypts) the data transmitted to the first trusted node.

In another specific example, the second trusted node also includes a second router. The second router performs quantum cryptography on the data to be transmitted and then transmits, which is equivalent to using the second router to realize the security lock function, so that the second trusted node can be used as a physical security device. Thus, on the one hand, the overall security of the second trusted node is improved, and on the other hand, it is laid a foundation for completing federated learning in decrypted state. In other examples, the second router further receives and manages (for example, decrypts) the data transmitted to the second trusted node.

In a specific example of the scheme of the present disclosure, the first trusted node can decrypt the received second intermediate training result in a following manner. Here, since the training data used by the first trusted node in the process of federated learning is in decrypted state, the hardware requirement of the first trusted node for federated learning is lowered, and the equipment cost is reduced, and then the cost of machine learning is reduced. Furthermore, since federated learning can be performed in decrypted state, which reduces the hardware requirement of the first trusted node, there are more types of machine learning models that can be trained by the scheme of the present disclosure. In other words, the types of machine learning models to be trained are not limited herein. Therefore, the application scope and adaptability of the present disclosure are wider, and the cost thereof is lower.

The decryption process specifically includes: decrypting the second intermediate training result based on a second quantum key generated by the first quantum key generation device contained in the first trusted node, wherein the second quantum key and a quantum key generated by the second quantum key generation device contained in the second trusted node form a quantum key pair, and the second trusted node encrypts the second intermediate training result based on the quantum key forming the quantum key pair with the second quantum key. That is, in this example, the first trusted node contains a quantum key generation device, that is, the first quantum key generation device, which can generate a quantum key, that is, the second quantum key. Moreover, the second quantum key is one of the quantum key pair (which includes symmetric keys), and the other quantum key of the quantum key pair is generated by the second quantum key generation device contain in the second trusted node which is a transmitting end of the second intermediate training result. The second intermediate training result is encrypted based on the quantum key forming the quantum key pair with the second quantum key. In this way, the receiving end of the second intermediate training result, that is, the first trusted node, can decrypt the encrypted second intermediate training result based on the second quantum key, to obtain the decrypted second intermediate training result, so that the data used by the first trusted node in the process of federated learning are all in decrypted state, thus reducing the cost of federated learning and enriching application scenarios.

It should be noted here that the receiving end or transmitting end described above is a relative concept. For example, for the second intermediate training result, the transmitting end is the second trusted node and the receiving end is the first trusted node; for the first intermediate training result, in the step of sending the first intermediate training result to the second trusted node, the receiving end is the second trusted node and the transmitting end is the first trusted node.

In a specific example, the first quantum key generation device contained in the first trusted node can generate not only the first quantum key for encryption, but also the second quantum key for decryption. Further, in an example, the quantum keys generated by the first quantum key generating device, for example, including the first quantum key and the second quantum key, are stored in their corresponding key pools, so the key pools can store the quantum keys. Similarly, the second quantum key generation device contained in the second trusted node can generate not only a quantum key for encryption, but also a quantum key for decryption. Further, in another example, the quantum keys generated by the second quantum key generation device may also be stored in their corresponding key pools. It should be noted that quantum keys used in the encryption and decryption processes are symmetrical, in other words, the quantum keys used in the encryption and decryption processes form a quantum key pair. Taking the second intermediate training result as an example, the quantum key used by the second trusted node to encrypt the second intermediate training result and the quantum key used by the first trusted node to decrypt the encrypted second intermediate training result form a quantum key pair. In this way, the encryption and decryption processes can be realized, which lays a foundation for ensuring the data security in the process of data transmission and also ensuring model training in decrypted state.

In a specific example of the scheme of the present disclosure, the first trusted node obtains target parameter values for model parameters of the learning completed target model to obtain a target model, that is, the first trusted node obtains a complete target model. Alternatively, the first trusted node obtains target parameter values for a part of model parameters of the learning completed target model, that is, the first trusted node obtains a part of the target model. That is to say, in practical applications, the target model obtained by the first trusted node may be a complete model, and may be a model with a part of it being training completed, thereby improving the flexibility of the scheme of the present disclosure, enriching the use scenarios of the scheme of the present disclosure, and laying a foundation for meeting different requirements of different scenarios.

In a specific example of the scheme of the present disclosure, after the first target data set is obtained, the first training data can also be determined in a following manner. Specifically, determining the first training data includes performing data identification matching for the first target data set and the second target data set performing federated learning with the first target data set to obtain a data set whose matching result meets a preset rule, and taking the data set in the first target data set whose matching result meets the preset rule as the first training data. Accordingly, in an embodiment, the second training data is also a data set in the second target data set whose matching result meets the preset rule. For example, in the process of vertical federated learning, participant A (i.e., the first participant) and participant B (i.e., the second participant) want to jointly train a preset machine learning model, and the user IDs of the data sets provided by participant A and participant B overlap greatly, but the feature spaces (i.e., data features) of the data sets provided by participant A and participant B do not coincide. In this case, the data with overlapping user IDs can be used as training data, so as to improve the efficiency of model training and the accuracy of model training results.

In a specific example of the scheme of the present disclosure, the first target data set is obtained via encrypting the data set provided by the first participant based on a third quantum key. That is to say, the data transmitted by the first participant to the first trusted node is also encrypted based on a quantum key, so as to further improve the security of data transmission between the participant and the trusted node.

In a specific example of the scheme of the present disclosure, the third quantum key can be generated in the following two modes. The details are as follows.

In mode one, the third quantum key is generated by a third quantum key generation device associated with the first participant, and the third quantum key and the quantum key generated by the first quantum key generation device contained in the first trusted node form a quantum key pair. Here, similar to the first quantum key and the second quantum key, the third quantum key is also one of the quantum key pair, and the other quantum key of the quantum key pair is generated by the first quantum key generation device contained in the first trusted node, which is thus convenient for the first trusted node to decrypt the first target data set encrypted based on the third quantum key. In practical applications, the first participant may contain or be associated with a quantum key generation device, so that the third quantum key is generated by the quantum key generation device contained or associated with the first participant.

In mode two, the third quantum key is generated by the first quantum key generation device contained in the first trusted node and charged into a mobile quantum key storage medium, so that the first participant can obtain the third quantum key from the mobile quantum key storage medium. For example, the first quantum key generation device generates a third quantum key and stores the third quantum key in the key pool of the first quantum key generation device. A quantum key charging device extracts the third quantum key from the key pool of the first quantum key generation device and charges the third quantum key into the mobile quantum key storage medium. The mobile quantum key storage medium is connected to the first participant so that the first participant can obtain the third quantum key and encrypt the first target data set based on the third quantum key. In practical applications, the mobile quantum key storage medium can also store other quantum keys, which is convenient for the first participant to realize encryption and decryption.

In practical applications, one of the above modes can be implemented in one encryption process, which is not limited herein.

In a specific example of the scheme of the present disclosure, the first trusted node is a node in a preset communication network, and the second trusted node joins the preset communication network after being authenticated with a quantum key, so that the second trusted node can perform federated learning with a trusted node in the preset communication network. That is to say, in practical applications, a preset communication network is formed, which is secure and trusted, and the first trusted node and the second trusted node belong to the nodes in the preset communication network. In this way, federated learning described in the scheme of the present disclosure can be realized based on at least any two trusted nodes in the preset communication network, and the cost of machine learning is reduced on the basis of realizing federated learning. Further, there are more types of machine learning models that can be used. In other words, the types of machine learning models to be trained are not limited herein, so the application scope and adaptability of the scheme of the present disclosure are wider, and the cost thereof is lower.

In this way, since the third party used for federated learning in the scheme of the present disclosure is a trusted node, there is no need to perform model training in encrypted state, which solves the existing problem of large consumption of extra storage, computing and network resources caused by model training in encrypted state, and reduces the cost of machine learning on the basis of realizing federated learning, such as reducing the costs of network bandwidth, computing resources and manpower maintenance. Furthermore, since the model training method according to the scheme of the present disclosure can be performed in decrypted state, there are more types of machine learning models that can be used. In other words, the types of machine learning models to be trained are not limited herein, so the application scope and adaptability of the present disclosure are wider, and the cost thereof is lower.

Figure 2:
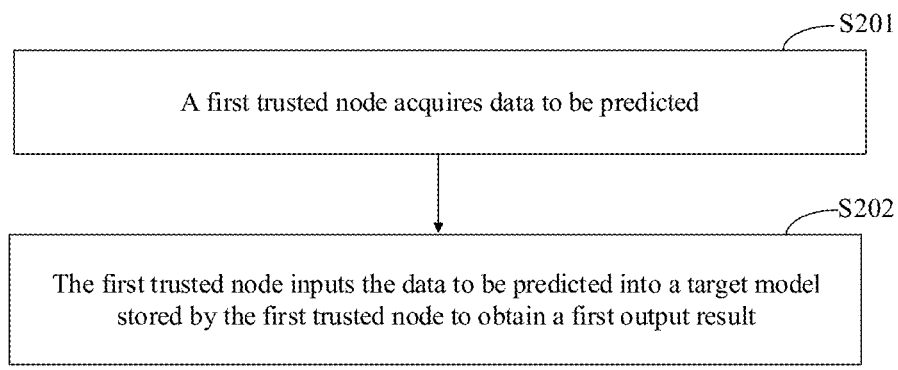
FIG. 2 shows an implementation flow diagram of a model using method based on federated learning according to an embodiment of the present disclosure.

According to the scheme of the present disclosure, a model using method based on federated learning is also provided. As shown in FIG. 2, the method includes step S201 and S202.

In step S201, a first trusted node acquires data to be predicted. Here, the data to be predicted is sent by a user equipment to be predicted, and the scheme of the present disclosure does not limit the user. Of course, the user may be a user who participates in model training or a user who does not participate in model training.

In practical applications, in order to avoid data leakage during transmission, the data to be predicted can also be encrypted data, for example, data encrypted by quantum encryption mode or data encrypted by classical encryption mode, such as RSA encryption algorithm, message-digest algorithm 5 (MD5), data encryption standard (DES) algorithm, etc. The scheme of the present disclosure is not limited thereto, provided that the encrypted data to be predicted may be decrypted before inputting into the target model in step S202.

In step S202, the first trusted node inputs the data to be predicted into a target model stored by the first trusted node to obtain a first output result, wherein the target model is a model obtained by the model training method described above.

In a specific example of the scheme of the present disclosure, the first trusted node takes the first output result as a prediction result for the data to be predicted. For example, when the target model stored by the first trusted node is a completed model, the first output result obtained by the first trusted node can be directly taken as a prediction result, and then the prediction result can be directly sent to the user equipment to complete the prediction process.

Alternatively, the data to be predicted are sent to the second trusted node participating in federated learning of the target model, a second output result sent by the second trusted node is received, wherein the second output result is obtained via inputting, by the second trusted node, the data to be predicted into a target model stored by the second trusted node; and a prediction result for the data to be predicted is obtained based on at least the first output result and the second output result. For example, when the target model stored by the first trusted node is not complete, that is, a part of the target model is included, in this case, in order to improve the accuracy of model prediction and complete the prediction process, participating nodes storing other part of the target model are required to participate in the prediction process, so as to make prediction based on the complete target model, and further improve the accuracy of model prediction. It should be noted here that, in practical applications, when there are more than two participating nodes in model training, and each of the participating nodes contains a part of the target model, all participating nodes in model training are required to participate in the model prediction process, so as to complete the prediction process and obtain the prediction result for the data to be predicted based on the complete target model. Of course, in an example, some participating nodes may store a part of the target model, and some participating nodes may store complete target model. The scheme of the present disclosure is not limited thereto, provided that the prediction process can be completed based on the complete target model to obtain the prediction result for the data to be predicted.

In this way, since the third party used for federated learning in the scheme of the present disclosure is a trusted node, there is no need to perform model prediction in encrypted state, which reduces the cost of model prediction, such as reducing the cost of network bandwidth, computing resources and manpower maintenance, etc., so the application scope and adaptability of the present disclosure are wider, and the cost thereof is lower.

Figure 3:
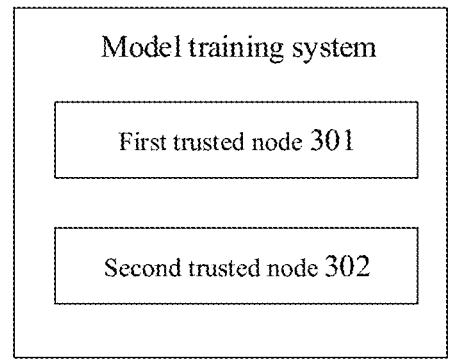
FIG. 3 shows a schematic structural diagram of a model training system based on federated learning according to an embodiment of the present disclosure.

According to the scheme of the present disclosure, a model training system based on federated learning is also provided, as shown in FIG. 3, including a first trusted node 301 and at least one second trusted node 302.

The first trusted node 301 is configured to receive a first target data set sent by a first participant. The first target data set is obtained via encrypting, by the first participant, a data set provided by the first participant based on a first preset encryption mode. The first trusted node 301 is further configured to decrypt the first target data set, determine first training data, and perform model training for a preset machine learning model based on the first training data to obtain a first intermediate training result.

The second trusted node 302 is configured to send an encrypted second intermediate training result. The second intermediate training result is obtained via performing, by the second trusted node, model training for the preset machine learning model based on at least second training data. The second training data is determined after decrypting, by the second trusted node, an encrypted second target data set, and the second target data set is provided by a second participant for federated learning with the first target data set.

In addition, the first trusted node is further configured to acquire the encrypted second intermediate training result sent by the at least one second trusted node, and perform federated learning for the preset machine learning model based on at least the first intermediate training result and the decrypted second intermediate training result, to update model parameters of the preset machine learning model and obtain a learning completed target model.

For example, in an example, the first trusted node contains a first router and a first quantum key generation device, and the second trusted node contains a second router and a second quantum key generation device. The first quantum key generation device and the second quantum key generation device communicate through a quantum signal or an optical fiber to generate a quantum key pair, and encrypt or decrypt transmitted data (such as the first intermediate training data, etc.) based on the generated quantum key pair. The first router and the second router communicate based on a classical communication network, for example, to transmit data encrypted by a quantum key. Here, the first router performs quantum encryption for the data to be transmitted and then transmit, which is equivalent to using the first router to realize the security lock function, so that the first trusted node can be used as a physical security device. Thus, on the one hand, the overall security of the first trusted node is improved, and on the other hand, it is laid a foundation for completing federated learning in decrypted state. Similarly, the second router performs quantum encryption for the data to be transmitted and then transmit, which is equivalent to using the second router to realize the security lock function, so that the second trusted node can be used as a physical security device. Thus, on the one hand, the overall security of the second trusted node is improved, and on the other hand, it is laid a foundation for completing federated learning in decrypted state.

In other examples, the first router further uniformly receives and manages (for example, decrypts) the data transmitted to the first trusted node, and the second router further uniformly receives and manages (for example, decrypts) the data transmitted to the second trusted node.

In this way, the preset communication network formed by the first trusted node and the second trusted node is trusted and secure.

In a specific example, both the first trusted node and the second trusted node are authenticated with a quantum key and then join the preset communication network, so as to further improve the security of the preset communication network.

The functions of the first trusted node and the second trusted node described here can refer to the corresponding descriptions in the above method, which will not be repeated here.

In this way, since the third party used for federated learning in the scheme of the present disclosure is a trusted node, there is no need to perform model training in encrypted state, which solves the existing problems of large consumption of extra storage, computing and network resources caused by model training in encrypted state, and reduces the cost of machine learning on the basis of realizing federated learning, such as reducing the costs of network bandwidth, computing resources and manpower maintenance. Furthermore, since the model training method according to the scheme of the present disclosure can be performed in decrypted state, there are more types of machine learning models that can be used. In other words, the types of machine learning models to be trained are not limited herein, so the application scope and adaptability of the present disclosure are wider, and the cost thereof is lower.

According to the scheme of the present disclosure, a model using system based on federated learning is also provided. The model using system includes a first trusted node and at least one second trusted node. The first trusted node and the second trusted node are trusted nodes participating in model training, and the first trusted node stores a part of the target model, and the second trusted node also stores a part of the target model.

The first trusted node is configured to acquire data to be predicted and input the data to be predicted into a target model stored by the first trusted node to obtain a first output result. The target model is a model obtained by the model training method described above.

The second trusted node is configured to receive the data to be predicted sent by the first trusted node, input the data to be predicted into a target model stored by the second trusted node to obtain a second output result, and send the second output result.

The first trusted node is further configured to obtain a prediction result for the data to be predicted based on at least the first output result and the second output result.

For example, when the target model stored by the first trusted node is not complete, that is, a part of the target model is included, in this case, in order to improve the accuracy of model prediction and complete the prediction process, participating nodes storing other part of the target model are required to participate in the prediction process, so as to make prediction based on the complete target model, and further improve the accuracy of model prediction. It should be noted here that, in practical applications, when there are more than two participating nodes in model training, and each of the participating nodes contains a part of the target model, all participating nodes in model training are required to participate in the model prediction process, so as to complete the prediction process and obtain the prediction result for the data to be predicted based on the complete target model. Of course, in an example, some participating nodes may store a part of the target model, and some participating nodes may store the complete target model. The scheme of the present disclosure is not limited thereto, provided that the prediction process can be completed based on the complete target model to obtain the prediction result for the data to be predicted.

The functions of the first trusted node and the second trusted node described here can refer to the corresponding descriptions in the above method, which will not be repeated here.

In this way, since the third party used for federated learning in the scheme of the present disclosure is a trusted node, there is no need to perform model prediction in encrypted state, which reduces the cost of model prediction, such as reducing the cost of network bandwidth, computing resources and manpower maintenance, etc., so the application scope and adaptability of the present disclosure are wider, and the cost thereof is lower.

The scheme of the present disclosure will be further explained in detail below in combination with specific examples. According to the scheme of the present disclosure, a specific network topology and algorithm are designed in combination with the technical means of data encryption and secure transmission in the field of quantum information. In addition, according to the scheme of the present disclosure, the data encryption and secure transmission technology in the field of quantum information are combined with federated learning, which can greatly improve the computing performance while ensuring the security of private data, and provides technical support for the application of artificial intelligence in areas with high security requirements such as finance, medical care and government affairs.

Figure 4:
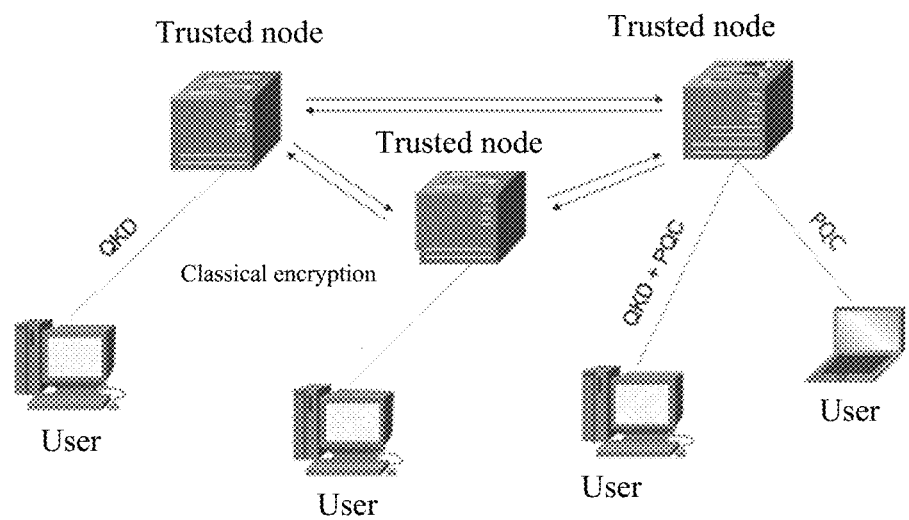
FIG. 4 shows a schematic diagram of a cluster of trusted nodes in a specific example of a model training method based on federated learning according to an embodiment of the present disclosure.

As shown in FIG. 4, the network topology according to the scheme of the present disclosure, that is, a preset communication network, refers to a network formed by a cluster of trusted nodes protected by quantum encryption technology. Each of the participants of federated learning can connect and communicate with trusted nodes shown in FIG. 4. Of course, it should be noted that the network topology shown in FIG. 4 is only an example. In practical applications, the network topology may also include other trusted nodes. In other words, the scheme of the present disclosure does not limit the number of trusted nodes in the cluster of trusted nodes. Further, each of the participants is only required to connect and communicate with the cluster of trusted nodes, and is not limited to connect with a specific node within the cluster of trusted nodes.

According to the scheme of the present disclosure, the data encryption and secure transmission technology in the field of quantum information are combined with federated learning, and the topology is more flexible, which can greatly improve the computing performance while ensuring the security of private data, and provides technical support for the application of artificial intelligence in areas with high security requirements such as finance, medical care and government affairs.

Further, based on the network topology as shown in FIG. 4, the scheme of the present disclosure will be described in detail.

Part I: firstly, four encryption modes involved in the scheme of the present disclosure are briefly introduced as follows.

Mode 1: Quantum Key Distribution (QKD) mode, which uses the characteristics of quantum mechanics to ensure communication security, so that both parties in communication can generate and share a random and secure quantum key to encrypt or decrypt data. That is, symmetric quantum keys (i.e., quantum key pair) are shared between end and end and transmitted through fiber channel. The quantum key is generated online and in real time, and its security is guaranteed by the physical characteristics of quantum (mainly photons), that is, the indivisibility and uncertainty principle of quantum can guarantee the security of quantum key. In practical applications, one-time key can be adopted, for example, one quantum key is used at a time in the encryption process, so as to achieve the communication security effect of information theory security.

Figure 5:
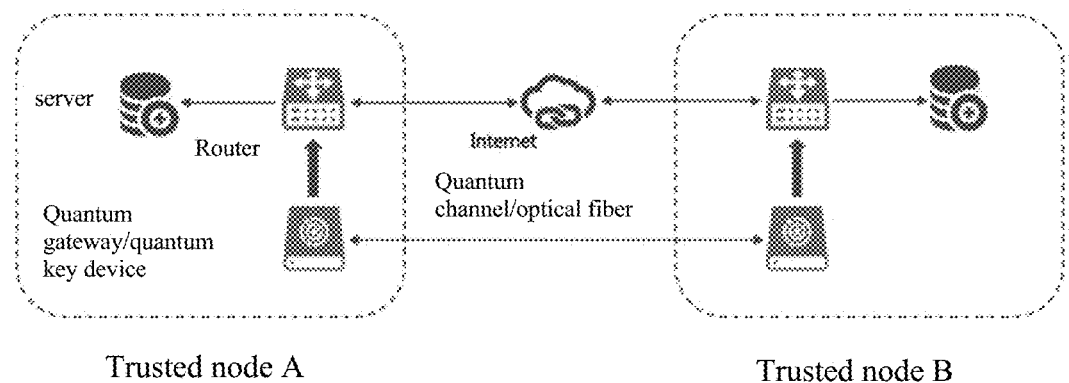
FIG. 5 shows a schematic diagram of the communication between trusted nodes in a specific example of a model training method based on federated learning according to an embodiment of the present disclosure.

Specifically, in an example, as shown in FIG. 5, each of the trusted nodes, such as trusted node A (i.e., the first trusted node) and trusted node B (i.e., the second trusted node), includes a server for data processing, a router for network connection, and a quantum gateway or quantum key device (i.e., the above-mentioned quantum key generation device) for generating a quantum key. A quantum key distribution network is formed between the quantum key generation devices contained in different trusted nodes, such as between the quantum key generation device of trusted node A (i.e., the first quantum key generation device) and the quantum key generation device of trusted node B (i.e., the second quantum key generation device), to generate quantum key pairs for encryption or decryption. In practical applications, quantum key generation devices contained in different trusted nodes are connected by optical fibers, that is, data transmission between the quantum key generation devices is performed through a quantum channel or an optical fiber, and then a quantum key pairs is generated. The encrypted data are transmitted between routers of different trusted nodes through a classical communication channel. The encryption process is as follows. A quantum key generation device generates a quantum key and stores the quantum key in its corresponding key pool. A router extracts the quantum key from the key pool, and decrypts or encrypts the data entering and leaving the router according to the authority.

In a specific example, the quantum encryption mode refers to the QKD mode, which is a remote key distribution mode using quantum as an information carrier. In practical applications, the core device for the quantum encryption mode is the quantum key generation device. Taking trusted node A and trusted node B as trusted nodes in the preset communication network as an example, the working process of generating and distributing a quantum key pair is as follows.

In step A, an optical device in the quantum key generation device (i.e., the first quantum key generation device) contained in the trusted node A generates an encoded quantum (e.g., mainly photons) sequence, and transmits the encoded quantum sequence to the quantum key generation device contained in the trusted node B through quantum channel or optical fiber network.

In step B, the quantum key generation device (i.e., the second quantum key generation device) contained in the trusted node B selects at least part of the quantum sequence as quantum key carrier based on an agreed quantum key distribution protocol (such as BB84 protocol, etc.); similarly, the quantum key generation device (i.e., the first quantum key generation device) contained in the trusted node A also selects at least part of the quantum sequence as quantum key carrier based on the agreed quantum key distribution protocol (such as BB84 protocol, etc.), to obtain a quantum key pair. Here, the sequence selected by the quantum key generation device contained in the trusted node A is the same as that selected by the quantum key generation device contained in the trusted node B, so that a symmetric quantum key pair is obtained.

In step C, an encoding converter in the quantum key generation device contained in the trusted node A reads the selected sequence and stores the selected sequence in the key pool. Similarly, an encoding converter in the quantum key generation device contained in the trusted node B reads the selected sequence and stores the selected sequence in the key pool.

In step D, when a router paired with the quantum key generation device transmits or receives data, the router extracts a quantum key from its corresponding key pool, and encrypts or decrypts the data. For example, the router contained in the trusted node A reads the quantum key from the key pool of the first quantum key generation device and encrypts the data to be transmitted; the router contained in the trusted node B reads the quantum key from the key pool of the second quantum key generation device and decrypts the received data.

In the above process, the carrier carrying the key encoding is quantum, that is, the carrier of quantum key is quantum. Therefore, based on the physical characteristics of quantum, the quantum key cannot be stolen, copied or measured in principle during transmission, thus ensuring information security. Furthermore, since quantum key distribution is taken as the guarantee of data security, and each of the trusted nodes may be used as a physical security device, the scheme of the present disclosure can use a federated learning strategy completely different from the traditional encryption mode.

It should be noted here that when a new node pre-joins the preset communication network, initial authentication is required for the new node, and after the authentication, the new node will be regarded as a trusted node of the scheme of the present disclosure.

Mode 2: Mode 2 is the combination of QKD and Post Quantum Cryptography (PQC), that is, a combined encryption mode of QKD and PQC. Here, PQC is a cryptographic algorithm that can resist known quantum computing attacks, and its security depends on computational complexity. Common PQC includes lattice ciphers (such as ciphers designed based on difficult problems such as shortest vector and nearest vector on lattice), ciphers based on random coding theory, etc. The combined encryption mode of QKD and PQC refers to using PQC for the initial authentication of an end requiring interaction in QKD, that is, performing initial authentication for the new node pre-joined to the preset communication network based on PQC, and then generating the required paired temporary keys or paired working keys (that is, the quantum key pair described above) through QKD. In an example, the quantum key can also be continuously updated based on QKD, for example, based on QKD mode, and the quantum key can be continuously updated by the quantum key generation device. In practical applications, the combined encryption mode can make the whole quantum encryption scheme have strong forward security, make the whole system cope with quantum attacks, and be more economical and feasible.

It should be noted here that mode 2 is similar to mode 1 as a whole, but the process of initial authentication for the new node is different. For example, in mode 1, the initial authentication for the new node is performed by the system management system, such as the authentication system (which may be a third-party authentication system independent of the trusted node), etc., to ensure the safety of device authentication. In mode 2, the device generated by PQC-based encryption algorithm is used to perform initial authentication for the authentication key generated by the new node, so as to avoid the system security risk caused by the cracking of the authentication key.

Mode 3: quantum secure service mobile engine (QSS-ME), which refers to the generation of local quantum key by quantum random number generator (QRNG). QRNG is a random number generator based on the uncertainty principle of quantum. The random number generated by QRNG is truly random. When QKD network cannot be accessed, this mode can be used to generate a quantum key, and this mode can also cooperate with QKD network to use the quantum key formed by QKD network for encryption transmission across regions, industries and units.

For example, the devices used in this mode include a quantum key generation device, a quantum key charging device, and a mobile quantum key storage medium. The specific process is as follows. The quantum key generation device generates a quantum key and stores the quantum key in its own key pool. The quantum key charging device extracts the quantum key from the key pool and charges the quantum key into the mobile quantum key storage medium. The mobile quantum key storage medium is connected to the client device, such as the device of the participant, and the corresponding data of the participant are encrypted or decrypted according to the authority. It should be noted here that, in an example, the quantum key generation device in this mode may be the quantum key generation device contained in the first trusted node. Of course, in practical applications, the quantum key generation device in this mode may also a quantum key generation device independent of the first trusted node or other quantum key generation devices independent of all trusted nodes, provided that the receiving end, such as the first trusted node, can decrypt the data encrypted based on this mode 3.

Mode 4: classical encryption mode, such as RSA, MD5, DES, etc., which are currently mainstream algorithms.

It should be noted here that mode 1 and mode 2 of the scheme of the present disclosure are suitable for data transmission between trusted nodes, that is, a trusted node encrypts the data to be transmitted based on the encryption mode of mode 1 or mode 2 and then sends the encrypted data to other trusted nodes. In addition, mode 1 or mode 2 are suitable for data encryption transmission between participants and trusted nodes, that is, a participant encrypts the data to be transmitted based on the encryption mode of mode 1 or mode 2, and then send the encrypted data to a trusted node. Mode 3 and mode 4 are suitable for data encryption transmission between participants and trusted nodes, that is, a participant encrypts the data to be transmitted based on the encryption mode of mode 3 or mode 4, and then send the encrypted data to a trusted node.

Based on this, the model training method based on federated learning according to the scheme of the present disclosure can specifically include: for a participant, encrypting the data set to be performed model training by using the above mode 1, mode 2, mode 3 or mode 4, and then uploading the encrypted data set to the trusted node designated by the participant, wherein the trusted node is a node encrypted with a quantum key device, and a plurality of such trusted nodes form a trusted node cluster network (i.e., a preset communication network). A preset machine learning model to be trained is deployed on each of the trusted nodes of the trusted node cluster network.

Part II: federal machine learning training and reasoning process.

Taking the vertical federated learning process as an example to further explain the scheme of the present disclosure. Suppose that participant A (i.e., the first participant) and participant B (i.e., the second participant) want to jointly train a preset machine learning model, and the user IDs of the data sets provided by participant A and participant B overlap greatly, but the feature spaces (i.e., data features) of the data sets provided by participant A and participant B do not coincide.

In step 1, the participant A encrypts the provided data set by any of the above four encryption modes and then uploads the encrypted data set to the trusted node A in the trusted node cluster network; similarly, the participant B encrypts the provided data set in any of the above four encryption modes and then uploads the encrypted data set to the trusted node B in the trusted node cluster network.

In step 2, the participant A and participant B align entities (that is, users included in the data sets provided by the participants). Due to the different user groups of participants, such as company A and company B, encryption-based user ID alignment technology can be used to identify the common users of both parties and obtain common entities. At this time, company A and company B will not expose their respective data. During entity alignment, users who do not overlap with each other will not be exposed.

In step 3, the trusted node A and the trusted node B train the preset machine learning model based on the common entities. Taking the linear regression model as an example, the specific process is as follows.

The trusted node A initializes model parameters to obtain a model parameter $\Theta_A$, and the trusted node B initializes model parameters to obtain a model parameter $\Theta_B$. Further, the trusted node A determines, based on the data set provided by itself, data matched with the common entities, obtains an intermediate variable $u_i^A$ by calculation based on the data matched with the common entities, and sends the intermediate variable to the trusted node B. Similarly, the trusted node B determines, based on the data set provided by itself, data matched with the common entities, obtains an intermediate variable $u_i^B$ by calculation based on the data matched with the common entities, and sends the intermediate variable to the trusted node A. The trusted node A calculates gradient $$\frac{\partial L}{\partial \Theta_A}$$

and updates the model parameter $\Theta_A$ based on the calculated gradient value. Similarly, the trusted node B calculates gradient $$\frac{\partial L}{\partial \Theta_b}$$

and updates the model parameter $\Theta_B$ based on the calculated gradient value. In this way, the objective loss function L is minimized by cyclic iteration to obtain the optimal model parameter $\Theta_A^*$ and the optimal model parameter $\Theta_R^*$.

In this way, the training is completed. After learning is completed, both trusted node A and trusted node B have training parameters of corresponding data feature dimensions, in other words, they have parts of the learning completed model. Of course, in practical applications, trusted node A or trusted node B, or any trusted node participating in federated learning, can have a complete learning completed model. The scheme of the present disclosure is not limited thereto.

At this time, if you want to reason for specific data, assuming that the reasoning requirements are initiated by participant A, the reasoning process is as follows.

The participant A sends encrypted data to be predicted to the trusted node A. The trusted node A receives the data to be predicted, sends the data to be predicted to the trusted node B, and receives the intermediate variable $u_i^B$ sent by the trusted node B. At this time, the trusted node A obtains a prediction result by calculation based on the obtained intermediate variable $u_i^A$ and the received intermediate variable $u_i^B$ to complete the prediction and reasoning process.

It should be noted that the initiator of reasoning requirements may be any party participating in model training or other parties not participating in model training. In this case, the other parties only need to send the data to be predicted to any trusted node participating in model training, and the prediction and reasoning process can be completed.

Of course, in practical applications, since the nodes used in the scheme of the present disclosure are trusted nodes, trusted node A and trusted node B can also share the optimal learning completed model parameters, so that all trusted nodes participating in model training, such as trusted node A and trusted node B, have a complete learning completed model.

The above is the process of vertical federated learning. In an example, the data set of participant A in the above process exists only in local and trusted node A, and similarly, the data set of participant B exists only in local and trusted node B. Thus, on the premise of protecting data privacy, multi-party joint machine learning is realized, and a machine learning model of joint training based on data features and labels of company A and company B is obtained.

Further, taking the process of horizontal federated learning as an example to further explain the scheme of the present disclosure, data sets provided by participants in the horizontal federated learning have the same data feature space, but the user IDs do not coincide. The process of model training and reasoning specifically includes two steps.

In a first step, participant A sends a data set to be trained to trusted node A, and the trusted node A calculates a gradient of the data set provided by the participant A, and synchronizes the calculated gradient of the data set provided by participant A to all participants participating in federated learning, such as participant B. Similarly, participant B sends a data set to be trained to trusted node B, and the trusted node B calculates a gradient of the data set provided by the participant B, and synchronizes the calculated gradient of the data set provided by participant B to all participants participating in federated learning, such as participant A. It should be noted here that the gradient transmitted between trusted nodes is the intermediate training result, and the gradient needs to be encrypted and then sent to other trusted nodes participating in federated learning. In this example, the data transmitted between trusted nodes can be encrypted in the same way as described in mode 1 or mode 2 above, which will not be repeated here.

In a second step, each of the trusted nodes participating in federated learning, such as trusted node A or trusted node B, updates its preset machine learning model with the decrypted gradient information, and iterates cyclically to minimize the target loss function. In an example, all trusted nodes participating in model training update the gradient information synchronously and minimize the target loss function. In this way, the model training is completed. At this time, all trusted nodes participating in federated learning have the same and complete model. Moreover, in this example, in the reasoning and prediction process, each of the trusted nodes participating in model training may complete the process independently. Of course, in another example, all gradient information can also be aggregated to a centered trusted node, and the centered trusted node updates the gradient information. At this time, a learning completed model exists in the centered trusted node.

In general, according to the scheme of the present disclosure, data encryption and secure transmission means of quantum key are used to replace homomorphic encryption, multi-party secure computing and other means in the existing federal machine learning, which not only ensures the security for the privacy of overall data, but also greatly reduces the computational load in the technical scheme of federated learning. In this way, the application scope of federated learning technology has been greatly expanded, and can be extended to most of the current widely used machine learning models, such as neural network, thus laying a foundation for the extensive application of federated learning in many industries such as finance, medical care, government affairs and industry.

In addition, the scheme of the present disclosure also reduces the application cost of federal learning technology. According to the scheme of the present disclosure, since training and reasoning do not need to be performed in encryption state, federated learning can be realized by deploying computing power resources suitable for ordinary machine learning in trusted nodes without increasing resource deployment such as additional computing power, network and so on. In practical applications, in order to implement the scheme of the present disclosure, each of the participants may only need to invest in the cost of a corresponding quantum encryption related device (such as a quantum key generation device, etc.), which is much lower than the cost of servers, all-in-one computers, etc. required in the existing federated learning scheme. Therefore, compared with the prior art, the scheme of the present disclosure can also reduce the implementation cost of federated learning.

Figure 6:
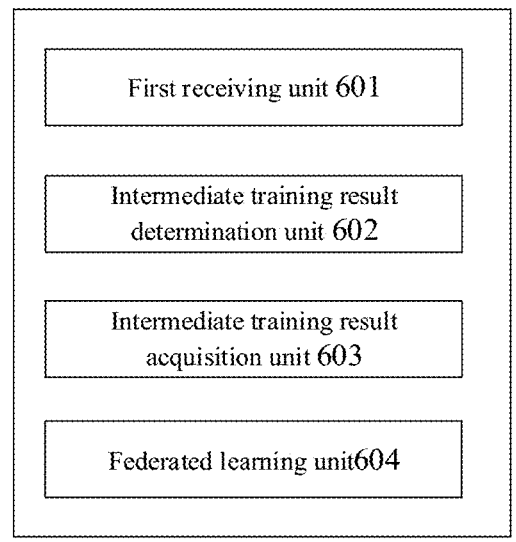
FIG. 6 shows a first schematic structural diagram of a first trusted node according to an embodiment of the present disclosure.

According to the scheme of the present disclosure, a first trusted node is also provided. As shown in FIG. 6, the first trusted node includes a first receiving unit 601 configured to receive a first target data set sent by a first participant. The first target data set is obtained via encrypting, by the first participant, a data set provided by the first participant based on a first preset encryption mode.

The first trusted node further includes an intermediate training result determination unit 602 configured to decrypt the first target data set, determine first training data, and perform model training for a preset machine learning model based on the first training data to obtain a first intermediate training result.

The first trusted node further includes an intermediate training result acquisition unit 603, configured to acquire an encrypted second intermediate training result sent by at least one second trusted node. The second intermediate training result is obtained via performing, by the second trusted node, model training for the preset machine learning model based on at least second training data, the second training data is determined after decrypting, by the second trusted node, an encrypted second target data set, and the second target data set is provided by a second participant for federated learning with the first target data set.

The first trusted node further includes a federated learning unit 604 configured to perform federated learning for the preset machine learning model based on at least the first intermediate training result and the decrypted second intermediate training result, to update model parameters of the preset machine learning model and obtain a learning completed target model.

In a specific example of the scheme of the present disclosure, the first trusted node further includes an encryption unit configured to encrypt the first intermediate training result based on a second preset encryption mode, and a first sending unit, configured to send the encrypted first intermediate training result to the second trusted node. The second trusted node is capable of decrypting the encrypted first intermediate training result to perform model training for the preset machine learning model and update the model parameters of the preset machine learning model.

In a specific example of the scheme of the present disclosure, the encryption unit is further configured to encrypt the first intermediate training result based on a first quantum key generated by a first quantum key generation device contained in the first trusted node.

In a specific example of the scheme of the present disclosure, the first quantum key generation device stores a key pool, and the key pool contains at least one quantum key.

The encryption unit is further configured to acquire the first quantum key from the key pool based on a first router contained in the first trusted node, and encrypt the first intermediate training result based on the first quantum key.

In a specific example of the scheme of the present disclosure, the first trusted node further includes:

a decryption unit, configured to decrypt the second intermediate training result based on a second quantum key generated by a first quantum key generation device contained in the first trusted node, wherein the second quantum key and a quantum key generated by a second quantum key generation device contained in the second trusted node form a quantum key pair, and the second trusted node encrypts the second intermediate training result based on the quantum key forming the quantum key pair with the second quantum key.

In a specific example of the scheme of the present disclosure, the first trusted node obtains target parameter values for the model parameters of the learning completed target model to obtain the target model.

Alternatively, the first trusted node obtains target parameter values for a part of model parameters of the learning completed target model to obtain a part of the target model.

In a specific example of the scheme of the present disclosure, the intermediate training result determination unit is further configured to perform data identification matching for the first target data set and the second target data set performing federated learning with the first target data set to obtain a data set whose matching result meets a preset rule, and take the data set in the first target data set whose matching result meets the preset rule as the first training data.

In a specific example of the scheme of the present disclosure, the first target data set is obtained via encrypting the data set provided by the first participant based on a third quantum key.

In a specific example of the scheme of the present disclosure, the third quantum key is generated by a third quantum key generation device associated with the first participant, and the third quantum key and a quantum key generated by the first quantum key generation device contained in the first trusted node form a quantum key pair.

Alternatively, the third quantum key is generated by the first quantum key generation device contained in the first trusted node and charged into a mobile quantum key storage medium, so that the first participant can acquire the third quantum key from the mobile quantum key storage medium.

In a specific example of the scheme of the present disclosure, the first trusted node is a node in a preset communication network, and the second trusted node joins the preset communication network after being authenticated with a quantum key, so that the second trusted node can perform federated learning with a trusted node in the preset communication network.

The functions of each unit in the first trusted node of an embodiment of the present disclosure can be referred to the corresponding description in the above method, which will not be repeated here.

Figure 7:
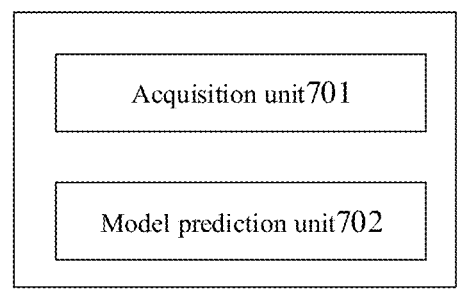
FIG. 7 shows a second schematic structural diagram of a first trusted node according to an embodiment of the present disclosure.

According to the scheme of the present disclosure, a first trusted node is also provided. As shown in FIG. 7, the first trusted node includes an acquisition unit 701 configured to acquire data to be predicted.

The first trusted node further includes a model prediction unit 702 configured to input the data to be predicted into a target model stored by the first trusted node to obtain a first output result. The target model is a model obtained by the model training method described above.

In a specific example of the scheme of the present disclosure, the first trusted node further includes a prediction result determination unit configured to take the first output result as a prediction result for the data to be predicted.

In a specific example of the scheme of the present disclosure, the first trusted node further includes a second sending unit configured to send the data to be predicted to a second trusted node participating in the federated learning of the target model.

The first trusted node further includes a second receiving unit configured to receive a second output result sent by the second trusted node, wherein the second output result is obtained via inputting, by the second trusted node, the data to be predicted into a target model stored by the second trusted node.

The first trusted node further includes a prediction result determination unit configured to obtain a prediction result for the data to be predicted based on at least the first output result and the second output result.

The functions of each unit in the first trusted node of an embodiment of the present disclosure can be referred to the corresponding description in the above method, which will not be repeated here.

According to an embodiment of the present disclosure, an electronic device, a readable storage medium and a computer program product are also provided.

Figure 8:
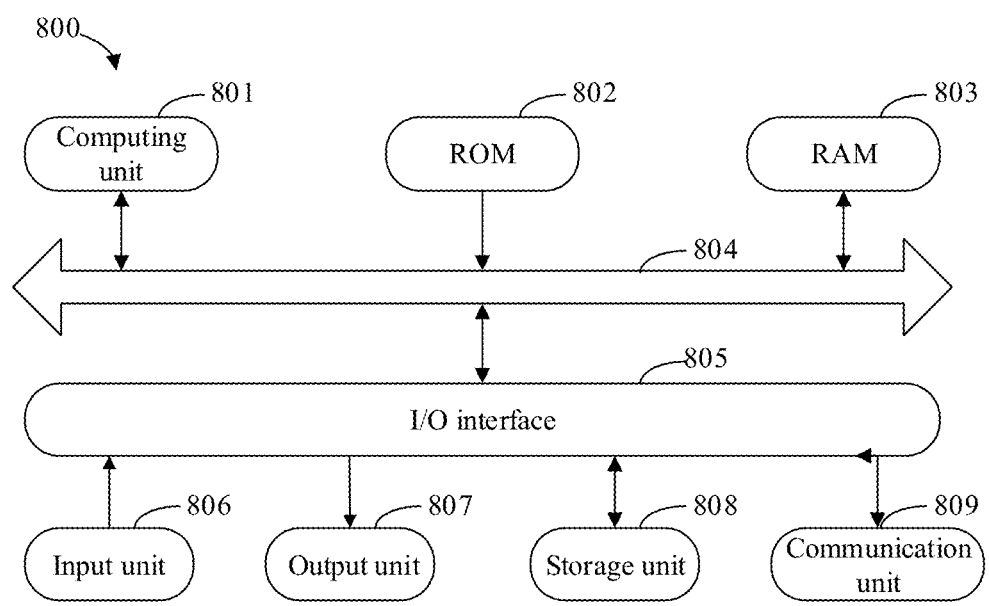
FIG. 8 shows a block diagram of an electronic device for implementing a model training method or a model using method based on federated learning according to an embodiment of the present disclosure.

FIG. 8 shows a schematic block diagram of an example electronic device 800 that can be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular phones, smart phones, wearable devices and other similar computing devices. The components shown herein, their connections and relationships, and their functions are merely examples, and are not intended to limit the implementation of the present disclosure described and/or claimed herein.

As shown in FIG. 8, the electronic device 800 includes a computing unit 801, which can perform various appropriate actions and processes according to a computer program stored in a read only memory (ROM) 802 or a computer program loaded from a storage unit 808 into a random access memory (RAM) 803. In the RAM 803, various programs and data required for the operation of the electronic device 800 can also be stored. The computing unit 801, the ROM 802, and the RAM 803 are connected to each other through a bus 804. An input/output (I/O) interface 805 is also connected to the bus 804.

A plurality of components in the electronic device 800 are connected to the I/O interface 805, including: an input unit 806, such as keyboard, mouse, etc.; an output unit 807, such as various types of displays and speakers; a storage unit 808, such as magnetic disk, optical disk, etc.; and a communication unit 809, such as network card, modem, wireless communication transceiver, etc. The communication unit 809 allows the electronic device 800 to exchange information/data with other devices through a computer network such as Internet and/or various telecommunication networks.

The computing unit 801 may be various general-purpose and/or special-purpose processing components with processing and computing capabilities. Some examples of the computing unit 801 include, but are not limited to, a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 801 executes various methods and processes described above, such as the model training method or the model using method based on federated learning. For example, in some embodiments, the model training method or model using method based on federated learning can be implemented as a computer software program tangibly embodied in a machine-readable medium, such as the storage unit 808. In some embodiments, part or all of the computer program may be loaded and/or installed on the electronic device 800 via the ROM 802 and/or the communication unit 809. When the computer program is loaded into the RAM 803 and executed by the computing unit 801, one or more steps of the model training method or the model using method based on federated learning described above can be executed. Alternatively, in other embodiments, the computing unit 801 may be configured to execute the model training method or the model using method based on federated learning by any other appropriate means (for example, by means of firmware).

Various embodiments of the system and technology described herein may be implemented in digital electronic circuit system, integrated circuit system, field programmable gate array (FPGA), application specific integrated circuit (ASIC), application specific standard product (ASSP), system on chip (SOC), load programmable logic device (CPLD), computer hardware, firmware, software, and/or a combination thereof. These various embodiments may include: being implemented in one or more computer programs that can be executed and/or interpreted on a programmable system including at least one programmable processor, where the programmable processor may be a special-purpose or general-purpose programmable processor and can receive/transmit data and instructions from/to a storage system, at least one input device and at least one output device.

Program codes for implementing the methods of the present disclosure can be written in any combination of one or more programming languages. The program codes can be provided to a processor or controller of a general-purpose computer, a special-purpose computer, or other programmable data processing apparatus, such that the program codes, when executed by the processor or controller, cause the functions/operations specified in the flowcharts and/or block diagrams to be implemented. The program codes can be executed entirely on a machine, partially on a machine, partially on a machine and partially on a remote machine as a separate software package, or completely on a remote machine or server.

In the context of the present disclosure, a machine-readable medium may be a tangible medium that may contain or store a program for use by or in combination with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the above. More specific examples of the machine-readable storage medium may include one or more wire-based electrical connections, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices, or any suitable combination of the above.

To provide interaction with a user, the system and technology described herein can be implemented on a computer having: a display device (e.g., CRT (Cathode Ray Tube) or LCD (Liquid Crystal Display) monitor) for displaying information to the user; and a keyboard and a pointing device (e.g., mouse or trackball) through which the user can provide input to the computer. Other kinds of devices can also be used to provide interaction with the user. For example, the feedback provided to the user may be any form of sensory feedback (e.g., visual feedback, auditory feedback, or tactile feedback); and the input from the user can be received in any form (including acoustic input, voice input, or tactile input).

The system and technology described herein can be implemented in a computing system including back-end components (for example, as a data server), or a computing system including middleware components (for example, an application server), or a computing system including front-end components (for example, a user computer with a graphical user interface or a web browser through which a user can interact with embodiments of the system and technology described herein), or a computing system including any combination of such back-end components, middleware components or front-end components. Components of the system can be connected to each other through digital data communication in any form or medium (e.g., communication network). Examples of communication networks include local area network (LAN), wide area network (WAN) and the Internet.

A computer system may include a client and a server. The client and the server are generally remote from each other and usually interact through a communication network. The relationship between the client and the server is generated by computer programs running on corresponding computers and having a client-server relationship with each other.

It should be understood that steps can be reordered, added or deleted using the various forms of processes shown above. For example, the steps described in the present disclosure can be executed in parallel, in sequence, or in different orders, which is not limited herein, provided that the desired results of the technical solutions of the present disclosure can be achieved.

The above description only relates to specific embodiments of the present disclosure, but the scope of protection of the present disclosure is not limited thereto. It should be understood by those skilled in the art that various modifications, combinations, sub-combinations and substitutions can be made according to design requirements and other factors. Any modification, equivalent substitution and improvement made within the spirit and principle of the present disclosure shall be included in the scope of protection of the present disclosure.

What is claimed is:

1. A model training method based on federated learning, comprising:
   receiving, by a first trusted node, a first target data set sent by a first participant, wherein the first target data set is obtained via encrypting, by the first participant, a data set provided by the first participant based on a first preset encryption mode;
   decrypting the first target data set, determining first training data, and performing model training for a preset machine learning model based on the first training data to obtain a first intermediate training result;
   acquiring an encrypted second intermediate training result sent by at least one second trusted node; wherein the second intermediate training result is obtained via performing, by the second trusted node, model training for the preset machine learning model based on at least second training data, the second training data is determined after decrypting, by the second trusted node, an encrypted second target data set, and the second target data set is provided by a second participant for federated learning with the first target data set;
   performing federated learning for the preset machine learning model based on at least the first intermediate training result and the decrypted second intermediate training result, to update model parameters of the preset machine learning model and obtain a learning completed target model, and
   decrypting the second intermediate training result based on a second quantum key generated by a first quantum key generation device contained in the first trusted node, wherein the second quantum key and a quantum key generated by a second quantum key generation device contained in the second trusted node form a quantum key pair, and the second trusted node encrypts the second intermediate training result based on the quantum key forming the quantum key pair with the second quantum key.

2. The method according to claim 1, further comprising:
   encrypting the first intermediate training result based on a second preset encryption mode, and sending the encrypted first intermediate training result to the second trusted node; wherein the second trusted node is capable of decrypting the encrypted first intermediate training result to perform model training for the preset machine learning model and update the model parameters of the preset machine learning model.

3. The method according to claim 2, wherein encrypting the first intermediate training result based on the second preset encryption mode comprises:
   encrypting the first intermediate training result based on a first quantum key generated by a first quantum key generation device contained in the first trusted node.

4. The method according to claim 3, wherein the first quantum key generation device stores a key pool, and the key pool comprises at least one quantum key; and
   encrypting the first intermediate training result based on the first quantum key generated by the first quantum key generation device contained in the first trusted node comprises:
   acquiring the first quantum key from the key pool based on a first router contained in the first trusted node, and encrypting the first intermediate training result based on the first quantum key.

5. The method according to claim 1, wherein the first trusted node obtains target parameter values for the model parameters of the learning completed target model to obtain the target model; or
   the first trusted node obtains target parameter values for a part of model parameters of the learning completed target model to obtain a part of the target model.

6. The method according to claim 1, wherein determining the first training data comprises:
   performing data identification matching for the first target data set and the second target data set performing federated learning with the first target data set to obtain a data set whose matching result meets a preset rule; and taking the data set in the first target data set whose matching result meets the preset rule as the first training data.

7. The method according to claim 1, wherein the first target data set is obtained via encrypting the data set provided by the first participant based on a third quantum key.

8. The method according to claim 7, wherein the third quantum key is generated by a third quantum key generation device associated with the first participant, and the third quantum key and a quantum key generated by a first quantum key generation device contained in the first trusted node form a quantum key pair; or the third quantum key is generated by the first quantum key generation device contained in the first trusted node and charged into a mobile quantum key storage medium, so that the first participant is capable of acquiring the third quantum key from the mobile quantum key storage medium.

9. The method according to claim 1, wherein the first trusted node is a node in a preset communication network, and the second trusted node joins the preset communication network after being authenticated with a quantum key, so that the second trusted node is capable of performing federated learning with a trusted node in the preset communication network.

10. A first trusted node, comprising:
a first receiving circuit, configured to receive a first target data set sent by a first participant, wherein the first target data set is obtained via encrypting, by the first participant, a data set provided by the first participant based on a first preset encryption mode;
an intermediate training result determination circuit, configured to decrypt the first target data set, determine first training data, and perform model training for a preset machine learning model based on the first training data to obtain a first intermediate training result;
an intermediate training result acquisition circuit, configured to acquire an encrypted second intermediate training result sent by at least one second trusted node; wherein the second intermediate training result is obtained via performing, by the second trusted node, model training for the preset machine learning model based on at least second training data, the second training data is determined after decrypting, by the second trusted node, an encrypted second target data set, and the second target data set is provided by a second participant for federated learning with the first target data set;
a federated learning circuit, configured to perform federated learning for the preset machine learning model based on at least the first intermediate training result and the decrypted second intermediate training result, to update model parameters of the preset machine learning model and obtain a learning completed target model, and
a decryption circuit, configured to decrypt the second intermediate training result based on a second quantum key generated by a first quantum key generation device contained in the first trusted node, wherein the second quantum key and a quantum key generated by a second quantum key generation device contained in the second trusted node form a quantum key pair, and the second trusted node encrypts the second intermediate training result based on the quantum key forming the quantum key pair with the second quantum key.

11. The node according to claim 10, further comprising:
an encryption circuit, configured to encrypt the first intermediate training result based on a second preset encryption mode; and
a first sending circuit, configured to send the encrypted first intermediate training result to the second trusted node; wherein the second trusted node is capable of decrypting the encrypted first intermediate training result to perform model training for the preset machine learning model and update the model parameters of the preset machine learning model.

12. The node according to claim 11, wherein the encryption circuit is further configured to encrypt the first intermediate training result based on a first quantum key generated by a first quantum key generation device contained in the first trusted node.

13. The node according to claim 12, wherein the first quantum key generation device stores a key pool, and the key pool comprises at least one quantum key; and the encryption circuit is further configured to acquire the first quantum key from the key pool based on a first router contained in the first trusted node, and encrypt the first intermediate training result based on the first quantum key.

14. The node according to claim 10, wherein the first trusted node obtains target parameter values for the model parameters of the learning completed target model to obtain the target model; or the first trusted node obtains target parameter values for a part of model parameters of the learning completed target model to obtain a part of the target model.

15. The node according to claim 10, wherein the intermediate training result determination circuit is further configured to perform data identification matching for the first target data set and the second target data set performing federated learning with the first target data set to obtain a data set whose matching result meets a preset rule, and take the data set in the first target data set whose matching result meets the preset rule as the first training data.

16. The node according to claim 10, wherein the first target data set is obtained via encrypting the data set provided by the first participant based on a third quantum key.

17. The node according to claim 16, wherein the third quantum key is generated by a third quantum key generation device associated with the first participant, and the third quantum key and a quantum key generated by a first quantum key generation device contained in the first trusted node form a quantum key pair; or the third quantum key is generated by the first quantum key generation device contained in the first trusted node and charged into a mobile quantum key storage medium, so that the first participant is capable of acquiring the third quantum key from the mobile quantum key storage medium.

18. The node according to claim 10, wherein the first trusted node is a node in a preset communication network, and the second trusted node joins the preset communication network after being authenticated with a quantum key, so that the second trusted node is capable of performing federated learning with a trusted node in the preset communication network.

\* \* \* \* \*